US012752264B2

(12) United States Patent
Zheng et al.

(10) Patent No.: US 12,752,264 B2
(45) Date of Patent: Oct. 6, 2026

(54) CHEMICAL-TYPE HYDROCRACKING CATALYST, PREPARATION METHOD THEREFOR, AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Junlin Zheng, Shanghai (CN); Xiangdong Jiang, Shanghai (CN); Huanxin Gao, Shanghai (CN); Cheng Li, Shanghai (CN); Qi Song, Shanghai (CN); Dejin Kong, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 658 days.

(21) Appl. No.: 18/248,878

(22) PCT Filed: Oct. 18, 2021

(86) PCT No.: PCT/CN2021/124302

§ 371 (c)(1),
(2) Date: Apr. 13, 2023

(87) PCT Pub. No.: WO2022/083526

PCT Pub. Date: Apr. 28, 2022

(65) Prior Publication Data

US 2023/0390749 A1 Dec. 7, 2023

(30) Foreign Application Priority Data

Oct. 19, 2020 (CN) .......................... 202011115942.6

(51) Int. Cl.

| | |
|---|---|
| ***B01J 29/78*** | (2006.01) |
| ***B01J 29/80*** | (2006.01) |
| ***B01J 35/30*** | (2024.01) |
| ***B01J 35/45*** | (2024.01) |
| ***B01J 35/60*** | (2024.01) |
| ***B01J 37/02*** | (2006.01) |
| ***B01J 37/18*** | (2006.01) |
| ***C10G 47/20*** | (2006.01) |

(52) U.S. Cl.

CPC ........... *B01J 29/80* (2013.01); *B01J 29/7815* (2013.01); *B01J 29/7876* (2013.01); *B01J 35/395* (2024.01); *B01J 35/45* (2024.01); *B01J 35/60* (2024.01); *B01J 37/0201* (2013.01); *B01J 37/18* (2013.01); *C10G 47/20* (2013.01); *B01J 2235/00* (2024.01); *B01J 2235/05* (2024.01); *B01J 2235/15* (2024.01); *B01J 2235/30* (2024.01); *C10G 2300/202* (2013.01); *C10G 2300/301* (2013.01); *C10G 2300/308* (2013.01); *C10G 2400/28* (2013.01); *C10G 2400/30* (2013.01)

(58) Field of Classification Search

CPC .... B01J 29/80; B01J 29/7815; B01J 29/7876; B01J 35/45; B01J 35/60; B01J 35/395; B01J 37/0201; B01J 37/18; C10G 47/20

See application file for complete search history.

(56) References Cited

U.S. PATENT DOCUMENTS

| | | | |
|---|---|---|---|
| 8,030,508 B2 | 10/2011 | Gao et al. | |
| 2011/0021855 A1 | 1/2011 | Lai | |
| 2018/0078929 A1 | 3/2018 | Al-Khattaf et al. | |

FOREIGN PATENT DOCUMENTS

| | | | | |
|---|---|---|---|---|
| CN | 1355136 A | 6/2002 | | |
| CN | 1955262 A | 5/2007 | | |
| CN | 1997593 A | 7/2007 | | |
| CN | 101121523 A | 2/2008 | | |
| CN | 101121524 A | 2/2008 | | |
| CN | 101724454 A | 6/2010 | | |
| CN | 102744098 A | 10/2012 | | |
| CN | 102839018 A | 12/2012 | | |
| CN | 103100429 A | 5/2013 | | |
| CN | 108262065 A | * 7/2018 | | ............. C10G 47/20 |
| IN | 105435836 A | 3/2016 | | |
| JP | 2016536240 A | 11/2016 | | |
| KR | 20120042059 A | 5/2012 | | |
| RU | 2362623 C2 | 7/2009 | | |
| RU | 2383584 C2 | 3/2010 | | |
| WO | 2015042114 A1 | 3/2015 | | |
| WO | 2015043114 A1 | 4/2015 | | |

OTHER PUBLICATIONS

Corma et al., Journal of Catalysis, (2001), v.200, p. 259-269. (Disclosed in IDS and provided by Applicant).*

Maheshwari et al., JACS, (2008), v.130, p. 1507-1516.*

Ponomareva. O. A. et al.; "Synthesis and Catalytic Properties of Zeolites With MWW Structure in Petrochemistry Processes (Review)." Petrochemistry, Oct. 11, 2017, vol. 57, No. 6, pp. 769-772.

Tempelman, C.H.L., et al.; "One-pot synthesis of nano-crystalline MCM-22"; Microporous and Mesoporous Materials, Aug. 24, 2016, vol. 220, pp. 28-38.

Corma, A. et al.; "Catalytic performance of the new delaminated ITQ-2 zeolite for mild hydrocracking and aromatic hydrogenation processes", Journal of Catalysis, vol. 200, May 16, 2001; ISSN: 0021-9517; pp. 259-269.

(Continued)

*Primary Examiner* — Yong L Chu

(74) *Attorney, Agent, or Firm* — NKL Law; Allen Xue

(57) ABSTRACT

A chemical-type hydrocracking catalyst contains the following components: a) a β zeolite, b) a layered MWW-type zeolite with a lamellar thickness of 2-12 nm, c) a metal functional component, d) a binder, and optionally e) a metal function regulating component. The catalyst can be used in hydrocracking reactions of feedstock oils rich in polycyclic aromatics for producing light aromatics and light alkanes.

18 Claims, 1 Drawing Sheet

(56) References Cited

OTHER PUBLICATIONS

Liu, Baijun et al.; "Synthesis of ITQ-2 Zeolite Under Static Conditions and Its Properties"; Science in China Ser. B Chemistry; vol. 35, No. 5; Dec. 31, 2005; ISSN:1674-7224; pp. 425-432.
Weitkamp, Jens; "Catalytic hydrocracking-mechanisms and versatility of the process"; ChemCatChem; vol. 4; Feb. 7, 2012; pp. 292-306.
Corma, A. et al.; "Delaminated zeolite precursors as selective acidic catalysts"; Nature; vol. 393; Nov. 26, 1998; pp. 353-356.

* cited by examiner

CHEMICAL-TYPE HYDROCRACKING CATALYST, PREPARATION METHOD THEREFOR, AND APPLICATION THEREOF

TECHNICAL FIELD

The present invention relates to a catalyst technology in the field of refining and hydrocracking, and further relates to a (chemical-type) hydrocracking catalyst, a preparation method therefor and an application thereof.

BACKGROUND TECHNOLOGY

Hydrocracking is one of the main processes for the deep processing of heavy fractions of oil. It refers to a hydrogenation process that makes 10% or more of molecules in the feedstock oil smaller through hydrogenation reactions. Hydrocracking technology is one of the important means for a secondary processing of a crude oil and a lightening of a heavy oil. Due to its characteristics such as high adaptability to raw materials, very flexible operation and product schemes and good product quality, it has become an important way to produce high-quality naphtha products and achieve the source of chemical raw materials. In the prior art, the naphtha hydrocracking process treats gasoline or naphtha as the target product. It produces light aromatics through the catalytic reforming process of naphtha, and can also produce olefin products through the steam cracking process of naphtha.

With the stagnant growth of diesel demand and the implementation of the national VI standard in 2019, there has been a significant surplus of inferior oil products in refinery enterprises, such as light cycle oil and ethylene tar. Light cycle oil is one of the main products during the catalytic cracking, with an annual output of about 50 million tons nationwide. Although their boiling points lie in the diesel fraction, due to the presence of a large amount of polycyclic aromatics or other reasons, it is not economical to process it into diesel, and some enterprises can only use it as a fuel oil.

On the basis of existing fuel-type hydrocracking catalysts and process technologies, relevant research institutes have developed technologies that can convert the light cycle oil into gasoline blending components with a high octane number, such as the technologies disclosed in Chinese patents CN101724454A and CN102839018A. The obtained heavy naphtha fraction has an aromatic content of 50-65%, which can be used as a gasoline blending component with a high octane number. The catalyst as used contains 20-75 wt % of Y-type zeolite. However, since the Y-type zeolite has wide pores, it does not have the shape-selective effect for cracking non-aromatics. The products of $C_8$, $C_9$ and $C_{10}$ fractions have low aromatic contents, and high non-aromatic contents. Due to the inability to meet the quality requirement of reformates, they have a great difficulty in entering an aromatics complex as raw materials for producing benzene and p-xylene. Chinese patent CN1955262A discloses a two-stage hydrocracking method, wherein the hydrocracking catalyst contains Pt—Pd noble metals and non-noble metals, Y zeolite with a high pore spaciousness index and alumina, and the raw material is light cycle oil. The highest aromatic potential value of the naphtha product is only 76.8%. The purity of the aromatics is not high, and cannot meet the quality requirement of the aromatics complex.

It has been found in research that the spaciousness index of zeolite as an acidic matrix in the hydrocracking catalyst plays a decisive role in the selectivity for the conversion path of different types of hydrocarbon molecules. The pore spaciousness index (SI) is an indicator characterizing the broadness degree of different 12-membered ring zeolite pores, ranging from 3 to 21. The spaciousness index of Y-type zeolite is close to 20 (see the literature Catalytic hydrocracking—mechanisms and versatility of the process, ChemCatChem 2012, 4, 292-306). Compared with the USY zeolite with a higher pore spaciousness index, zeolite with a low pore spaciousness index between 6 and 18 has the advantages of the strong ring opening and selective cracking abilities and the weak hydrogen transfer effect. Among them, β zeolite having a three-dimensional 12-membered ring pore structure and a pore spaciousness index between 15 and 18 has a pore size smaller than USY zeolite and does not have supercages. Its pore characteristics endow it with the excellent isomerization and cracking abilities, and the application in hydrocracking reactions.

Chinese patent CN103100429A discloses a diesel hydro-upgrading catalyst carrier and the preparation method thereof, wherein β zeolite undergoes a uniform dealumination by hydrothermal treatment so that it has good isomerization and cracking effects on long-chain alkanes and cycloalkanes, and can significantly lower the freezing point of diesel fractions and improve the cetane number of the upgraded diesel while maintaining the high diesel oil yield. Its target product is not a chemical product such as aromatics, and can be classified as a middle distillate-type hydrocracking catalyst. Patent CN105435836A discloses a hydrocracking catalyst, and the preparation method and the application thereof. A mixture of ZSM-5 and Moβzeolites is used as an acid functional component. The loaded active metal components also need to undergo a sulfurization process to be converted into a metal sulfide component. It significantly improves the hydrocracking reaction of bicyclic and polycyclic aromatics and the selectivity for ideal products, and has a high tetralin conversion and BTX selectivity.

However, the diameter of the 12-membered ring pore of the β zeolite is about 0.67 nm. The molecules of tricyclic or more condensed aromatics in the raw material or generated during the reaction process cannot enter the pore and contact the active center, resulting in a poor conversion ability of the tricyclic or more condensed aromatics.

Therefore, there is an urgent need to develop a chemical-type hydrocracking catalyst to address issues such as the poor ability of the catalyst to convert condensed aromatics, maximize the conversion of these inferior oil products into light aromatics that satisfy the quality requirement of the aromatics complex and by-produced high-quality light alkanes that can be used as olefin feedstocks, directly provide raw materials for aromatics, olefins etc. chemical plants, and realize the utilization of inferior heavy aromatic resources and the cost reduction and the efficiency increase of the aromatic industry through the refinery-chemical integration.

SUMMARY OF THE INVENTION

Regarding the problems in the prior art of the low selectivity of hydrocracking catalysts for the light aromatics and light alkane chemical raw materials (hereinafter sometimes referred to as "chemical raw materials") and the poor ability to convert polycyclic aromatics, the present invention provides a (chemical-type) hydrocracking catalyst, which can be used in the hydrocracking reaction of a feedstock oil rich in polycyclic aromatics, has characteristics such as a high selectivity for light aromatics and light alkane and a strong ability to convert polycyclic aromatics (in particular heavy polycyclic aromatics), and can realize the chemical utilization of the inferior oil products rich in polycyclic aromatics such as the light cycle oil. Here, the polycyclic aromatics refer to the bicyclic or more condensed aromatics; the heavy polycyclic aromatics refer to the tricyclic or more condensed aromatics; and particularly the tetracyclic or more condensed aromatics are referred to as the superheavy condensed aromatics. The light aromatics refer to the aromatics with a carbon number less than 11, including $C_6$ aromatics, such as benzene; $C_7$ aromatics, such as toluene; $C_8$ aromatics, such as ethylbenzene, xylenes; $C_9$ aromatics, such as methylethylbenzene, propylbenzene and trimethylbenzene; $C_{10}$ aromatics, such as tetramethylbenzene, dimethylethylbenzene, diethylbenzene. The light alkanes refer to the alkanes of $C_5$ or less, preferably $C_2$-$C_5$ light alkanes, such as ethane, propane, n-butane, isobutane, n-pentane, isopentane One object of the present invention is to provide a (chemical-type) hydrocracking catalyst comprising the following components:

a) a β zeolite, preferably a hydrogen-type β zeolite;

b) a layered MWW-type zeolite with a lamellar thickness of 2-12 nm;

c) a metal functional component;

d) a binder;

optionally, further comprising e) a metal function regulating component.

When the above hydrocracking catalyst of the present invention is based on a total zeolite weight of 100 parts, the metal functional component is preferably 0.1 to 60 parts, more preferably 0.2 to 50 parts, further more preferably 0.2 to 45 parts based on element; and the binder is preferably 5 to 2000 parts, more preferably 10 to 1000 parts, further more preferably to 900 parts.

In the above hydrocracking catalyst of the present invention, the β zeolite preferably accounts for 50-99 wt %, more preferably 60-95 wt % of the total zeolite amount. The total zeolite comprises the above β zeolite and layered MWW-type zeolite.

The layered MWW-type zeolite preferably accounts for 1-50 wt %, more preferably 5-40 wt % of the total zeolite amount.

Preferably the β zeolite taking a majority in total weight plays a dominant role in cracking, while the lamellar layered MWW-type zeolite can realize the conversion of the large polycyclic aromatic molecules.

The β zeolite comprised in the hydrocracking catalyst of the present invention described above has the very strong abilities for the isomerization and the cracking of alkanes and tetralin-type hydrocarbons in hydrotreated feedstock oils, and has a high single-pass conversion rate. Moreover, the pore spaciousness index is preferably between 15 and 18, and the pore shape-selective effect can further crack alkanes and cycloalkanes in the light aromatic fraction, resulting in a high selectivity for light aromatics; meanwhile a large amount of $C_2$-$C_5$ light alkanes are by-produced due to the occurrence of β-scission and dealkylation reactions.

The silica-to-alumina ratio(SAR) of the above β zeolite is preferably between 10 and 200, and β zeolite with a SAR between 30 and 100 is more preferred. The β zeolite in this range has not only a strong cracking ability, but also a strong resistance to nitrogen poison, as is very important for the long-term stable operation of the catalyst.

The layered MWW-type zeolite contained in the hydrocracking catalyst of the present invention described above is a lamellar layered zeolite, with a lamellar thickness in the range of 2-12 nm, preferably 2-10 nm, more preferably 2-6 nm. The layered MWW-type zeolite contained in the hydrocracking catalyst of the present invention described above has a SAR preferably between 10 and 100.

The MWW-type zeolite has a layered structure and the layers are connected by oxygen bridge bonds, including 10-membered ring two-dimensional pores in the layers having a size of nm×0.59 nm and 12-membered ring supercages having a size of 0.71 nm×0.71 nm×1.82 nm. The surface of the MWW-type zeolite is distributed with a 0.71 nm×0.71 nm×0.71 nm cup-shape structure rich in active centers. The inventor discovers after research that the catalyst formed by combining a typical MWW-type zeolite, such as MCM-22 zeolite, with the zeolite cannot achieve the desired technical effect. The monolayers of the typical MWW-type zeolite are each other condensed together by chemical bonds and cannot be easily opened. The thickness of the final zeolite particles that can be dispersed is usually large (greater than 12 nm), and the vacancies with active centers are not in an open state, so the large molecules of the polycyclic aromatics (especially the heavy polycyclic aromatics) cannot be approached. However, if the lamellar thickness of the layered MWW-type zeolite is controlled within the range of 2-12 nm, preferably 2-10 nm, more preferably 2 to 6 nm to form a quasi-two-dimensional structural material and the 12-membered ring supercage is opened to form a lamellar layered MWW-type zeolite with the active centers in the cup-shape structure as the main body, there is a good availability for the large molecules of the polycyclic aromatics (especially the heavy polycyclic aromatics), and an effective conversion can be achieved. Thus, only the synergistic effect of the lamellar layered MWW-type zeolite and β zeolite in the present invention can achieve the very good technical effects in terms of the high selectivity for light aromatics and light alkane chemical raw materials and the excellent conversion of the polycyclic aromatics (especially the heavy polycyclic aromatics).

The layering of the MWW-type zeolite can be achieved through layering methods in the prior art. As what is reported by A Corma et al. (Nature, 1998, 396: 353-356), ITQ-2 zeolite, which is prepared through the surfactant swelling-ultrasonic stripping starting from the two-dimensional layered precursors with a MWW structure, has a typical lamellar structure. The two-dimensional layered (i.e., lamellar layered) MWW-type zeolite can also be obtained by direct synthesis methods. Two-dimensional nano sheet materials SRZ-21 zeolite (see Chinese patents CN101121523A and CN101121524A) and SCM-1 zeolite (see Chinese patents CN2014000867, WO2015/042114A1) are respectively obtained by using a forced layer separation of organosilylation reagents and the direct hydrothermal synthesis of dual organic templates. The layered MWW-type zeolite of the present invention is further preferably ITQ-2 zeolite, SRZ-21 zeolite, and SCM-1 zeolite with a lamellar thickness of 2 to 10 nm. The preferred layered MWW-type zeolite of the present invention and its preparation method can be incorporated entirely by Chinese patents CN101121523A, CN101121524A (counterpart U.S. Pat. No. 8,030,508B2) and WO2015/042114A1.

According to one aspect of the present invention, the metal functional component in the catalyst of the invention is the noble metal platinum (Pt) and/or palladium (Pd), or a composition of at least one of Group VIII metals in a non-sulfurized state and Group JIB metals in a non-sulfurized state with a Group VIB metal oxide in a non-sulfurized state.

Based on parts by weight, the metal functional component in the catalyst composition of the present invention is calculated based on element. Based on a total zeolite weight of 100 parts, the metal functional component is preferably 0.1 to 60 parts, more preferably 0.2 to 50 parts, further more preferably 0.2 to 45 parts, based on element, specifically for example 0.1, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 21, 22, 23, 24, 25, 26, 27, 28, 29, 30, 31, 32, 33, 34, 35, 36, 37, 38, 39, 40, 41, 42, 43, 44, 46, 47, 48, 49, 50, 51, 52, 53, 54, 55, 56, 57, 58, 59, 60 parts, etc.

According to a preferred embodiment of the present invention, the metal functional component in the catalyst composition is a composite (composition) of a Group VIII metal-Group IIB metal-Group VIB metal oxide in a non-sulfurized state, i.e., a composite (combination) of at least one Group VIII metal and/or Group IIB metal in a non-sulfurized state with at least one Group VIB metal oxide. The inventor discovers after research that at least one of Group VIII metal and/or Group IIB metal and a Group VIB metal oxide have a moderate hydrogenation ability and a good sulfur resistance after being reduced in hydrogen atmosphere, and are particularly suitable for use in (chemical-type) hydrocracking catalysts.

The above metal functional component is more preferably a composite of at least one of nickel (Ni), cobalt (Co) and zinc (Zn) in a non-sulfurized state with molybdenum oxide (MoOx) and/or tungsten oxide (WOx), where x represents the presence of oxygen vacancies, with an x value between 2 and 2.6, which can be understood as a composite of a tetravalent Group VIB metal oxide and a hexavalent Group VIB metal oxide.

The Group JIB metal is preferably zinc. The component can be chemically combined as a compound such as an oxide or zinc ion with one or more other components in the final catalyst composition, or exist as a metal element in the composition. Typical compounds containing zinc that can be used are zinc nitrate, zinc chloride, zinc oxalate, zinc acetate, with zinc nitrate particularly preferably used as a source of the zinc component.

The Group VIII metal is preferably selected from at least one of the group consisting of cobalt and nickel. The component can be chemically combined as a compound such as an oxide with one or more other components in the final catalyst composition, or exist as a metal element in the composition. Typical cobalt group compounds that can be used are cobalt nitrate, cobalt chloride, cobalt oxalate, with cobalt nitrate preferably used as a particularly preferred source of the cobalt component. Typical nickel group compounds that can be used are nickel nitrate, nickel sulfate, nickel halide, nickel oxalate, nickel acetate, with nickel nitrate preferably used as a particularly preferred source of the nickel components.

The Group VIB metal oxide is preferably selected from at least one of the group consisting of molybdenum oxide and tungsten oxide. The Group VIB metal oxide can be incorporated into the catalyst in any suitable manner, such as co-precipitation with the catalyst carrier, co-gelling, kneading, ion exchange or impregnation. It is preferable to use a water-soluble compound of the metal for impregnation, drying and then calcination, and the metal is in an oxidized state. The molybdenum oxide is molybdenum dioxide and/or molybdenum trioxide. Typical molybdenum group compounds that can be used are ammonium molybdate, molybdenum trioxide, with ammonium molybdate preferably used as a source of molybdenum oxide. The tungsten oxide is tungsten dioxide and/or tungsten trioxide. Typical tungsten group compounds that can be used are ammonium tungstate, sodium tungstate, with ammonium tungstate preferably used as a source of tungsten oxide.

When the metal functional component is a composite of Group VIII metal-Group IIB metal-Group VIB metal oxides, the weight ratio of Group VIB metal to the sum of Group VIII metal and Group IIB metal is (0.2 to 20): 1, preferably (0.3 to 15): 1, more preferably (1 to 10):1, based on metal element. Oxygen vacancies are formed during the reduction process. The x value in the composite of nickel (Ni) and/or cobalt (Co) in a non-sulfurized state, zinc in a non-sulfurized state, molybdenum oxide (MoOx) and/or tungsten oxide (WOx) can be determined by XPS (X-ray photoelectron spectroscopy).

According to a preferred embodiment of the present invention, the metal functional component in the catalyst composition is at least one of the noble metals of platinum and palladium.

The Pt and/or Pd noble metals are common metal functional components in hydrogenation catalysts; Pt and Pd noble metals can be incorporated into the catalyst in any suitable manner, such as co-precipitation with the catalyst carrier, co-gelling, ion exchange or impregnation. It is preferred to use a water-soluble compound of the metal for impregnation. Typical platinum group compounds that can be used are chloroplatinic acid, ammonium chloroplatinate, bromoplatinic acid, platinum dichloride, platinum tetrachloride hydrate, tetraamineplatinum chloride, tetraamineplatinum nitrate, platinum dichlorocarbonyl dichloride, diammineplatinum(II) nitrite, platinum chloride, platinum chloride dihydrate, platinum nitrate, with tetraamineplatinum chloride preferably used as a particularly preferred source of the platinum component. Typical palladium group compounds that can be used are palladium chloride, palladium chloride dihydrate, palladium nitrate dihydrate, tetraaminepalladium chloride, with tetraaminepalladium chloride preferably used as a particularly preferred source of the palladium component.

According to an aspect of the present invention, the catalyst in the present invention may also contain a metal function regulating component, preferably comprising tin (Sn) and/or bismuth (Bi). The metal function regulating component can affect the electron cloud structure of the hydrogenation phase of the composite metal oxide, enhance or weaken the hydrogenation function within a certain range, and play a role in regulating the metal function. Based on metal element, the weight ratio of the metal functional component to the metal function regulating component is preferably (0.1~20): 1, preferably (0.1~15): 1.

According to an aspect of the present invention, the binder in the catalyst according to the present invention may be selected from a catalyst binder commonly used in the prior art of the present field to provide good mechanical properties and textural properties. The binder of the present invention preferably includes one of alumina and silica, wherein the alumina can specifically be pseudoboehmite or the like, and the silica can specifically be a composition of a porous silica gel powder and an ammonia-type silica sol, or the like.

The above binder is based on parts by weight. In the catalyst composition of the present invention, based on a total zeolite weight of 100 parts, the binder is preferably 5 to 2000 parts, more preferably 10 to 1000 parts, further more preferably 10 to 900 parts, specifically for example 10, 20, 30, 40, 50, 60, 70, 80, 80, 100, 200, 300, 400, 500, 600, 700, 800, 900 parts, etc.

The binder in the present invention can be combined into the catalyst in any appropriate manner, such as kneading with zeolite, extruding, aging, drying and calcination to obtain a catalyst carrier.

According to the catalyst system of the present invention, the catalyst of the present invention can also include conventional components of the catalyst in the art, such as diatomite, active clay, etc., and the amount thereof can be the usual amount.

Another object of the present invention is to provide a method for preparing the hydrocracking catalyst according to the present invention.

For example, the preparation of the catalyst according to the present invention may, for example, include the steps of molding a catalyst carrier containing the zeolite and loading components including the metal functional component, followed by calcination and activation, to obtain a catalyst precursor, and then reduction of the catalyst precursor. The molding of the carrier can be performed by subjecting the zeolite and the binder together to extrusion, ball rolling, or oil-drop method etc. usually used in the art; the loading of the metal can be carried out by common methods in the art such as co-precipitation, co-gelling, kneading, ion exchange or impregnation of the metal and the catalyst carrier.

The above preparation method of the composite catalyst system of the present invention can preferably include the steps of:

1) mixing and drying components including the β zeolite and the layered MWW-type zeolite and the binder, then calcining in an air atmosphere at 500 to 600° C. to obtain a desired catalyst carrier;
2) formulating a metal aqueous solution with metal components comprising a metal compound of the noble metal(s) of platinum and/or palladium, or comprising at least one of the Group VIII metal compound and the Group JIB metal compound and a Group VIB metal compound; impregnating the catalyst carrier obtained above by an incipient wetness impregnation method, calcining in an air atmosphere at 450 to 580° C. after drying to obtain a catalyst precursor;
3) reducing the obtained catalyst precursor under a hydrogen condition to 400 to 500° C. to obtain the catalyst;

optionally formulating the metal compound of the metal function regulating components into a metal aqueous solution before the above step 2) and after step 1), carrying out an incipient wetness impregnation of the catalyst carrier obtained in step 1), calcining in an air atmosphere at 350 to 500° C. after drying.

The above preparation method of the composite catalyst system of the present invention can more specifically include: mixing the zeolite (including the β zeolite and the layered MWW-type zeolite) with the binder, kneading, extruding, drying at 60-150° C., and then calcining in an air atmosphere at 500-600° C. for 3-6 hours to obtain the desired catalyst carrier. Optionally, the metal function regulating components are formulated into an aqueous solution, and the obtained catalyst carrier is incipient wetness impregnated, then dried at 60-150° C., and then calcined in an air atmosphere at 350-500° C. for 1-6 hours. An aqueous solution of metal functional components is prepared with Pt and/or Pd metal compounds, or at least one of the Group VIII metal compound and the Group IIB metal compound and a Group VIB metal compound. The catalyst carrier optionally loaded with the metal function regulating component is treated by the incipient wetness impregnation method, followed by drying at 60 to 150° C. and then calcining in an air atmosphere at 450 to 580° C. for 1 to 6 hours to obtain a catalyst precursor. The catalyst precursor is reduced to 400500° C. under a hydrogen condition and maintained for 2-24 hours to complete the catalyst activation procedure and obtain the catalyst.

A further object of the present invention is to provide the application of the (chemical-type) hydrocracking catalyst of the present invention in a hydrocracking reaction.

The application of the (chemical-type) catalyst of the present invention in the hydrocracking reaction includes the step of contacting the (chemical-type) catalyst of the present invention, under a hydrocracking reaction condition, with a feedstock oil, preferably a feedstock oil rich in aromatics, more preferably a feedstock oil rich in polycyclic aromatics, such as light cycle oil and ethylene tar.

According to one aspect of the present invention, the feedstock oil suitable for the catalyst of the present invention in the hydrocracking reaction is a feedstock oil rich in aromatics, and can specifically be light cycle oil, ethylene tar and the like that have been hydrotreated. The aromatic content in the feedstock oil is preferably greater than or equal to 50% by weight, such as 50% by weight, 55% by weight, 60% by weight, 65% by weight, 70% by weight, 75% by weight, 80% by weight, 85% by weight, 90% by weight, 95% by weight, or 100% by weight. It is further preferred that the nitrogen content of the feedstock oil is ≤20 ppm and the sulfur content is ≤200 ppm.

Generally, the hydrocracking feedstock oil has a nitrogen content below 20 ppm after a usual hydrotreating treatment, and nitrogen is present in the form of polyalkyl carbazole in the high boiling range, such as 20, 19, 18, 17, 16, 15, 14, 13, 12, 11, 10, 9, 8, 7, 6, 5, 4, 3, 2, and 1 ppm, etc.

Generally, the sulfur content of the hydrocracking feedstock oil after a usual hydrotreating treatment is below 200 ppm, and sulfur is present in the form of polyalkyl dibenzothiophene in the high boiling range, such as 200, 190, 180, 170, 160, 150, 140, 130, 120, 110, 100, 90, 80, 70, 60, 50, 40, 30, 20, and 10 ppm, etc.; under a preferred condition, the sulfur content is below 100 ppm.

No matter whether a composite of Group VIII metal-Group JIB metal-Group VIB metal oxide or at least one of Pt and Pd noble metals is loaded on the composite carrier of the β zeolite and the lamellar layered MWW-type zeolite, the hydrogenation catalyst of the present invention has a good sulfur resistance and can satisfy the long-term stable operation under a low sulfur condition.

According to an aspect of the present invention, the hydrocracking reaction conditions preferably include a temperature of 300 to 450° C., a hydrogen partial pressure of 2.0 to 10.0 MPa, a liquid hourly space velocity of 0.2 to 4.0 hour$^{-1}$, a hydrogen/oil volume ratio of 500 to 4000. Under a more preferred condition, the hydrocracking reaction conditions include a temperature of 320 to 420° C., a hydrogen partial pressure of 5.0 to 9.0 MPa, a liquid hourly space velocity of 0.5 to 2.0 hour$^{-1}$, a hydrogen/oil volume ratio of 1000 to 3000.

According to an aspect of the present invention, the hydrocracking reaction carried out using the hydrocracking catalyst of the present invention under the above hydrocracking reaction conditions has a single-pass conversion of greater than 70% by weight for the fractions at above 200° C., and a total selectivity of greater than 80% by weight for the chemical raw materials including light aromatics and $C_2$-$C_5$ light alkanes.

According to one aspect of the present invention, the catalyst of the present invention, under the hydrocracking reaction condition, has a total selectivity of more than 80% by weight for the chemical raw materials including light aromatics and $C_2$-$C_5$ light alkanes in the hydrocracking products after the hydrocracking reaction of the feedstock oil.

The present invention further relates to the use of the layered MWW-type zeolite for the conversion of the polycyclic aromatics, wherein the lamellar thickness of the layered MWW-type zeolite is preferably in the range of 2-12 nm, more preferably 2-10 nm, further more preferably 2-6 nm.

The present invention provides a (chemical-type) hydrocracking catalyst that can be used to produce light aromatics and light alkanes used for chemical industry, and realize the conversion of low value oil products rich in polycyclic aromatics such as light cycle oil to chemical products such as light aromatics and olefins. The (chemical-type) hydrocracking catalyst of the present invention uses a combination of β zeolite with a SAR of 30-100 and the layered MWW-type zeolite with a lamellar thickness of only 2-12 nm as an acidic functional component. β zeolite plays a dominant role in cracking. Due to the pore shape-selective effect of β zeolite, tetralin-type hydrocarbons are selectively converted into light aromatics; alkanes and cycloalkanes in the light aromatic fraction are further cracked; the purity of aromatics in the obtained heavy naphtha can meet the requirements of the aromatic complex; and meanwhile a large amount of $C_2$-$C_5$ light alkanes are produced as olefin feedstocks. The lamellar MWW structured zeolite can realize the conversion of the large molecules of the polycyclic aromatics (especially the heavy polycyclic aromatics). A lightening reaction occurs during the feedstock oil conversion, reducing the formation of coke precursors. The (chemical-type) hydrocracking catalyst exhibits the characteristics of the high single-pass conversion of the feedstock, the high yield and purity of light aromatics, and the good catalyst stability.

DESCRIPTION OF THE DRAWINGS

Therein FIG. 1 is a TEM micrograph of the β zeolite used in Examples 2-5 and Example 7 of the present invention, having a particle size between 200 and 500 nm.

Therein FIG. 2 is a TEM micrograph of the layered MWW-type zeolite—SRZ-21 zeolite used in the examples of the present invention. An obvious layered structure can be observed, with a single-layer MWW structure having a lamellar thickness of 2.6-2.7 nm, and there are also a small amount of double- or triple-layer MWW structure, with a lamellar thickness of about 5-9 nm.

MODE OF CARRYING OUT THE INVENTION

Figure 1:
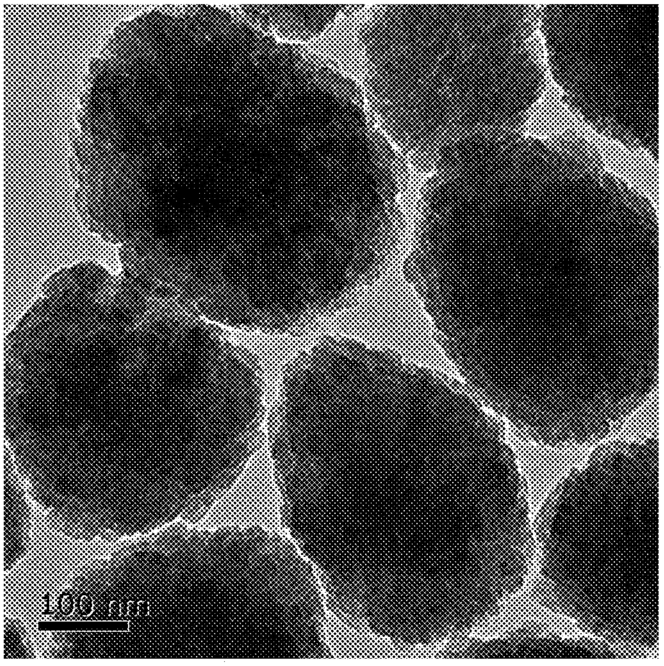
FIG. 1 is a TEM micrograph of the β zeolite of the hydrocracking catalyst in the present invention.

The present invention will be further described in detail through embodiments. However, it needs to be indicated that the protection scope of the present invention is not limited hereto, but is determined by the appended claims. Within the scope of the technical concept of the present invention, various simple variations of the technical solutions of the present invention can be made, and these simple variations are all within the protection scope of the present invention.

It needs to be further indicated that the various specific technical features described in the following embodiments can be combined in any appropriate manner where there is no contradiction. To avoid an unnecessary repetition, the possible combinations of the present invention will not be described separately.

In addition, different embodiments of the present invention can also be combined arbitrarily, as long as they do not violate the ideas of the present invention. The technical solution formed therefrom belongs to a part of the original disclosure of the present description, and meanwhile also falls within the protection scope of the present invention, but should not be considered as new contents that have not been disclosed or expected herein, unless those skilled in the art believe that the combination is obviously unreasonable.

In the context of the present description, except for the explicitly stated contents, any unmentioned matter is directly applicable to those known in the art without requiring any change.

All the publications, patent applications, patents and other reference literatures mentioned in the present description are incorporated herein by reference. Unless otherwise defined, all the technical and scientific terms used in the present description have the meanings conventionally understood by those skilled in the art. In case of conflict, the definitions in the present description shall prevail.

When materials, substances, methods, steps, devices, or parts etc. are derived in the present description using the prefix "known to those skilled in the art", "prior art", or similar terms, the objects derived from the prefix cover those conventionally used in the art at the time of filing of the present application, and also include those that are not commonly used currently but will become applicable for similar purposes as generally recognized in the art.

Without specification, all percentages, parts, ratios and the like mentioned in the present description are based on weight, unless the use of weight as a basis does not conform to the conventional understanding of those skilled in the art; the units of temperature are all ° C., the pressure is a gauge pressure, and the space velocity as mentioned is the liquid hourly space velocity LHSV.

None of the endpoints and the values of the ranges disclosed herein is limited to the precise ranges or values, and these ranges or values should be understood to include the values close to these ranges or values. Value ranges between endpoint values of each range, between endpoint values of each range and individual point values, and between individual point values can be combined with each other to obtain one or more new value ranges, which should be considered as specifically disclosed herein. In the following text, various technical solutions can be combined with each other in principle to obtain new technical solutions, which should also be considered as specifically disclosed herein.

Test Methods and Standards Involved in the Embodiments of the Present Invention 1. in the present invention, the composition of the catalyst is analyzed by ICP (Inductive Coupled Plasma Emission Spectrometer) and XRF (X-ray fluorescence) methods. The composition ratio of Group VIB metal oxides is determined using XPS (X-ray photoelectron spectroscopy). The ICP test condition is: Varian 700-ES series XPS spectrometer. The XRF test condition is: Rigaku ZSX 100e XRF spectrometer. The XPS test condition is: Perkin Elmer PHI 5000C ESCA X-ray photoelectron spectrometer, use of Mg K excitation light source, operating voltage of 10 kV, current of 40 mA, vacuum degree of $4.0\times10^{-8}$ Pa.

2. in the present invention, the composition of the feedstock oil and the lightening product is determined by gas chromatography. The chromatographic model is Agilent 7890A, equipped with a FID detector, and a FFAP capillary chromatographic column for separation. The chromatographic column uses programmed heating with an initial temperature of 90° C., which is maintained for 15 minutes, and then is heated to 220° C. at a rate of 15° C./minute and maintained for 45 minutes. GC-MS and GC-FID methods are used to analyze the content of tetracyclic and more aromatics in hydrocracking products and realize a quantitative analysis of superheavy aromatics of pyrene (tetracyclic) to coronene (heptacyclic).

3. in the present invention, the method for determining the pore spaciousness index is as follows: loading a specific hydrogen-type 12-membered ring zeolite with 0.1-0.5 wt % of platinum or palladium noble metal for the hydrocracking reaction of butyl cyclohexane, and analyzing the molar ratio of isobutane to n-butane in the product, which is the pore spaciousness index of this 12-membered ring zeolite. This spaciousness index can be used to characterize the broadness degree of different 12-membered ring zeolite pores.

The calculation bases of main result data involved in the embodiments of the present invention are as follows:

1. the formula for calculating the total conversion (single-pass conversion of fractions above 200° C.) is:

$$\text{total conversion (wt \%)} = \frac{\text{amount of fractions above 200° C. in the raw material} - \text{amount of fractions above 200° C. in the product}}{\text{amount of fractions above 200° C. in the raw material}} \times 100\%$$

2. the formula for calculating the total selectivity for chemical raw materials is:

$$\text{total selectivity for chemical raw materials (wt \%)} = \frac{\text{amount of } C6-C10 \text{ light hydrocarbons in the product} + \text{amount of } C2-C5 \text{ light hydrocarbons in the product}}{\text{amount of fractions above 200° C. in the raw material} - \text{amount of fractions above 200° C. in the product}} \times 100\%$$

3. activity attenuation rate of online operation for 200 hours:

$$\text{200 h activity attenuation rate (wt \%)} = \frac{\text{total conversion } (TOS = 24\text{ h}) - \text{total conversion } (TOS = 200\text{ h})}{\text{total conversion } (TOS = 24\text{ h})}$$

Raw materials involved in the embodiment portion of the present invention:

1. to illustrate the effects of the present invention, two representative feedstock oils are provided. The composition of the feedstocks is shown in Table 1. Feedstock oil 1 and Feedstock oil 2 are hydrotreated light cycle oil.

2. the raw materials involved in the examples and the comparative examples of the present invention, including but not limited to the raw materials of catalysts, are all commercially available.

TABLE 1

| | Feedstock oil 1 | Feedstock oil 2 |
|---|---|---|
| density (4° C.) | 0.91 | 0.92 |
| sulfur (wtppm) | 93 | 56 |
| nitrogen (wtppm) | 14.3 | 7.4 |
| non-aromatics (wt) | 25.60 | 17.60 |
| monocyclic aromatics (wt %) | 50.08 | 70.27 |
| polycyclic aromatics (wt %) | 24.32 | 12.13 |
| initial boiling point | 195 | 157 |
| 5% | 206 | 179 |
| 10% | 216 | 188 |
| 30% | 245 | 223 |
| 50% | 266 | 242 |
| 70% | 336 | 263 |
| 90% | 351 | 285 |
| end boiling point | 365 | 325 |
| fractions > 200° C. (wt %) | 97 | 80 |

Comparative Example 1

Hydrogen-type β zeolite is selected from the hydrogen-type β zeolite of SINOPEC CATALYST DIVISION, which has a silica-to-alumina ratio (SAR) of 50.5 and a pore spaciousness index of 16.5. Its transmission electron microscope (TEM) micrograph is shown in FIG. 1. After hydrogen-type β zeolite and pseudoboehmite were fully mixed, they were kneaded, extruded, dried at 120° C., and then calcined in an air atmosphere at 550° C. for 4 hours, to obtain a desired catalyst carrier. A bimetallic aqueous solution was formulated with nickel nitrate and ammonium tungstate, and the above catalyst carrier was impregnated by the incipient wetness impregnation method. After drying at 120° C. and then calcination in an air atmosphere at 500° C. for 2 hours, a catalyst precursor was obtained. The obtained catalyst precursor was reduced to 450° C. under a hydrogen condition and maintained for 4 hours to obtain the hydrocracking catalyst C0 which, based on parts by weight, consisted of: 3.5 parts of Ni-12.5 parts of $WO_x$/62 parts of β zeolite-22 parts of $Al_2O_3$ as balance, wherein x was 2.43.

Feedstock 1 was used as the feedstock oil. The reaction conditions were: temperature of 390° C., pressure of 8.5 MPa, LHSV of 1.0 $hour^{-1}$, hydrogen-oil volume ratio of 3000. After a stable operation for 24 hours, samples were taken for analysis and calculation, wherein the total conversion was 93.20% and the total selectivity of chemical raw materials was 89.77%. The reaction condition and the feedstock remained unchanged, and after 200 hours of online operation, samples were taken for analysis and calculation, wherein the total conversion was 81.59%, and the total selectivity of chemical raw materials was 83.23%. The activity attenuation rate of the catalyst at 200 h was 12.46%.

After further analysis, the content of tetracyclic and more superheavy aromatics in the hydrocracking product of 200 hours of online operation was 0.55% (see Table 3).

[Example 1] Preparation of Layered MWW-Type Zeolite

The layered MWW-type zeolite of the present invention is selected from the SRZ-21 zeolite of SINOPEC CATALYST DIVISION, and the specific preparation is as follows (according to Example 1 of the description of CN101121524A):

6.1 g of sodium aluminate ($Al_2O_3$ content=42.0 wt %) was dissolved in 288 g of water, and 1.0 g of sodium hydroxide was added to dissolve it. Then under stirring, 34.0 g of hexahydropyridine was added, 60 g of solid silica and 5.5 g of trimethylsilyl chloride were then added. The reactants had material ratios (molar ratios) as follows:

$SiO_2/Al_2O_3$=40

$NaOH/SiO_2$=0.025 trimethylsilyl chloride/$SiO_2$=0.05, hexahydropyridine/$SiO_2$=0.50, $H_2O/SiO_2$=16

After stirred homogeneously, the reaction mixture was charged into a stainless steel reactor and allowed to crystallize at 135° C. for 50 hours under stirring. Then the reaction mixture was discharged, filtered, washed, dried to give a SRZ-21 zeolite. The chemical analysis gave a molar ratio of $SiO_2/Al_2O_3$ of 42.1.

Solid $^{29}$Si MAS NMR spectrum was measured on a sample of the dried product, and the $^{29}$Si MAS NMR spectrum exhibited a nuclear magnetic resonance peak at 15.1 ppm. Its X-ray diffraction data are shown in the Table 2 below, having MWW structural features.

TABLE 2

| d-spacing (Å) | I/Io |
|---|---|
| 12.36 | 100 |
| 10.98 | 42 |
| 9.31 | 23 |
| 6.86 | 26 |
| 6.15 | 21 |
| 5.54 | 19 |
| 4.46 | 39 |
| 3.99 | 50 |
| 3.40 | 86 |

Figure 2:
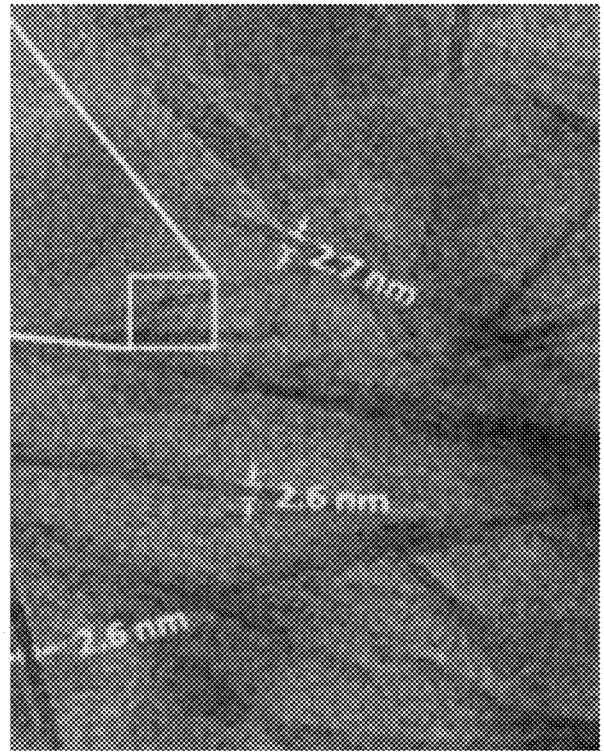
FIG. 2 is a TEM micrograph of the layered MWW-type zeolite of the hydrocracking catalyst in the present invention.

The above SRZ-21 zeolite has a SAR of 42.1. FIG. 2 is a TEM micrograph of the SRZ-21 zeolite. It can be observed that the SRZ-21 zeolite has an obvious lamellar structure, wherein the single-layer MWW structure has a lamellar thickness of 2.6-2.7 nm, and there are also a small amount of double- or triple-layer MWW structures, with a lamellar thickness of about 5-9 nm.

Example 2

The hydrogen-type β zeolite raw material is the same as β zeolite in Comparative Example 1;

The layered MWW-type zeolite is selected from the SRZ-21 zeolite prepared in Example 1.

After the above hydrogen-type β zeolite, SRZ-21 zeolite and pseudoboehmite were fully mixed, they were kneaded, extruded, dried at 120° C., and then calcined in an air atmosphere at 530° C. for 2 hours, to obtain a desired catalyst carrier. A bimetallic aqueous solution was formulated with nickel nitrate and ammonium tungstate, and the above catalyst carrier was impregnated by the incipient wetness impregnation method. After drying at 90° C. and then calcination in an air atmosphere at 500° C. for 2 hours, a catalyst precursor was obtained. The obtained catalyst precursor was reduced to 450° C. under a hydrogen condition and maintained for 4 hours, which could obtain the hydrocracking catalyst C1 of the present invention. Based on parts by weight, it consisted of: 3.5 parts of Ni-12.5 parts of $WO_x$/152 parts of β zeolite-10 parts of SRZ-21-22 parts of $Al_2O_3$ as balance, wherein x was 2.41.

Feedstock 1 was used as the feedstock oil. The reaction conditions were: temperature of 375° C., pressure of 8.5 MPa, LHSV of 1.0 hour$^{-1}$, hydrogen-oil volume ratio of 3000. After a stable operation for 24 hours, samples were taken for analysis and calculation, wherein the total conversion was 93.81% and the total selectivity of chemical raw materials was 90.05%. The reaction condition and the feedstock remained unchanged, and after 200 hours of online operation, samples were taken for analysis and calculation, wherein the total conversion was 91.65%, and the total selectivity of chemical raw materials was 86.41%. The activity attenuation rate of the catalyst at 200 h was 2.30%.

After further analysis, the content of tetracyclic and more superheavy aromatics in the hydrocracking product of 200 hours of online operation was 0.27%.

Example 3

The hydrogen-type β zeolite raw material is the same as β zeolite in Comparative Example 1;

The layered MWW-type zeolite is selected from the SRZ-21 zeolite prepared in Example 1.

After the hydrogen-type β zeolite, SRZ-21 zeolite and pseudoboehmite were fully mixed, they were kneaded, extruded, dried at 120° C., and then calcined in an air atmosphere at 530° C. for 2 hours, to obtain a desired catalyst carrier. A trimetallic aqueous solution was formulated with cobalt oxalate, ammonium tungstate and ammonium molybdate, and the catalyst carrier was impregnated by the incipient wetness impregnation method. After drying at 90° C. and then calcination in an air atmosphere at 500° C. for 2 hours, a catalyst precursor was obtained. The obtained catalyst precursor was reduced to 480° C. under a hydrogen condition and maintained for 6 hours, which could obtain the hydrocracking catalyst C2 of the present invention. Based on parts by weight, it consisted of: 1.3 parts of Co-5.8 parts of $WO_{x1}$-6.7 parts of $MoO_{x2}$/35 parts of β zeolite-15 parts of SRZ-21-36.2 parts of $Al_2O_3$ as balance, wherein x1 was 2.55 and x2 was 2.30.

Feedstock 1 was used as the feedstock oil. The reaction conditions were: temperature of 390° C., pressure of 8.5 MPa, LHSV of 1.0 hour$^{-1}$, hydrogen-oil volume ratio of 3000. After a stable operation for 24 hours, samples were taken for analysis and calculation, wherein the total conversion was 94.23% and the total selectivity of chemical raw materials was 91.45%. The reaction condition and the feedstock remained unchanged, and after 200 hours of online operation, samples were taken for analysis and calculation, wherein the total conversion was 92.61%, and the total selectivity of chemical raw materials was 88.55%. The activity attenuation rate of the catalyst at 200 h was 1.72%.

After further analysis, the content of tetracyclic and more superheavy aromatics in the hydrocracking product of 200 hours of online operation was 0.09%.

Example 4

The hydrogen-type β zeolite raw material is the same as β zeolite in Comparative Example 1;

The layered MWW-type zeolite is selected from the SRZ-21 zeolite prepared in Example 1.

After the hydrogen-type β zeolite, SRZ-21 zeolite and pseudoboehmite were fully mixed, they were kneaded, extruded, dried at 120° C., and then calcined in an air atmosphere at 530° C. for 2 hours, to obtain a desired catalyst carrier. A bimetallic aqueous solution was formulated with zinc chloride and ammonium molybdate, and the catalyst carrier was impregnated by the incipient wetness impregnation method. After drying at 100° C. and then calcination in an air atmosphere at 480° C. for 3 hours, a catalyst precursor was obtained. The obtained catalyst precursor was reduced to 500° C. under a hydrogen condition and maintained for 4 hours, which could obtain the hydrocracking catalyst C3 of the present invention. Based on parts by weight, it consisted of: 3.8 parts of Zn-13.5 parts of $MoO_x$/65 parts of β zeolite-5 parts of SRZ-21-12.7 parts of $Al_2O_3$ as balance, wherein x was 2.09.

Feedstock 1 was used as the feedstock oil. The reaction conditions were: temperature of 370° C., pressure of 8.5 MPa, LHSV of 1.0 hour$^{-1}$, hydrogen-oil volume ratio of 3000. After a stable operation for 24 hours, samples were taken for analysis and calculation, wherein the total conversion was 95.07% and the total selectivity of chemical raw materials was 91.32%. The reaction condition and the feedstock remained unchanged, and after 200 hours of online operation, samples were taken for analysis and calculation, wherein the total conversion was 93.84%, and the total selectivity of chemical raw materials was 89.47%. The activity attenuation rate of the catalyst at 200 h was 1.29%.

After further analysis, the content of tetracyclic and more superheavy aromatics in the hydrocracking product of 200 hours of online operation was 0.20%.

Example 5

The hydrogen-type β zeolite raw material is the same as β zeolite in Comparative Example 1;

The layered MWW-type zeolite is selected from the SRZ-21 zeolite prepared in Example 1.

After the hydrogen-type β zeolite, SRZ-21 zeolite and pseudoboehmite were fully mixed, they were kneaded, extruded, dried at 120° C., and then calcined in an air atmosphere at 550° C. for 3 hours, to obtain a desired catalyst carrier. Bismuth nitrate was dissolved in water, loaded on the catalyst carrier by the incipient wetness impregnation method, dried at 110° C. and then calcined in an air atmosphere at 400° C. for 3 hours. A trimetallic solution was formulated with nickel oxalate, zinc acetate, and ammonium molybdate, and the above bismuth-loaded catalyst carrier was impregnated by the incipient wetness impregnation method. After drying at 100° C. and then calcination in an air atmosphere at 500° C. for 3 hours, a catalyst precursor was obtained. The catalyst precursor was reduced to 450° C. under a hydrogen condition and maintained for 4 hours, which could obtain the hydrocracking catalyst C4 of the present invention. Based on parts by weight, it consisted of: 0.8 parts of Zn-3.5 parts of Ni-1.5 parts of Bi-13.5 parts of $MoO_x$/35 parts of β zeolite-5 parts of SRZ-21-40.7 parts of $Al_2O_3$ as balance, wherein x was 2.15.

Feedstock 1 was used as the feedstock oil. The reaction conditions were: temperature of 390° C., pressure of 8.5 MPa, LHSV space velocity of 1.0 hour$^{-1}$, hydrogen-oil volume ratio of 3000. After a stable operation for 24 hours, samples were taken for analysis and calculation, wherein the total conversion was 93.56% and the total selectivity of chemical raw materials was 89.99%. The reaction condition and the feedstock remained unchanged, and after 200 hours of online operation, samples were taken for analysis and calculation, wherein the total conversion was 90.27%, and the total selectivity of chemical raw materials was 85.73%. The activity attenuation rate of the catalyst at 200 h was 3.52%.

After further analysis, the content of tetracyclic and more superheavy aromatics in the hydrocracking product of 200 hours of online operation was 0.16%.

Example 6

Hydrogen-type β zeolite is selected from the hydrogen-type β zeolite of SINOPEC CATALYST DIVISION, which has a SAR of 82.5 and a pore spaciousness index of 15.8.

The layered MWW-type zeolite is selected from the SRZ-21 zeolite prepared in Example 1.

After the hydrogen-type β zeolite, SRZ-21 zeolite and porous silica gel powder ($SiO_2$ content of greater than 99.9 wt %) were fully mixed, an ammonia-type silica sol with 30% of $SiO_2$ on a dry basis was added. They were kneaded, extruded, dried at 120° C., and then calcined in an air atmosphere at 600° C. for 4 hours, to obtain a desired catalyst carrier. Stannic chloride was dissolved in water, loaded on the catalyst carrier by the incipient wetness impregnation method, dried at 110° C. and then calcined in an air atmosphere at 400° C. for 2 hours. A bimetallic aqueous solution was formulated with palladium chloride and chloroplatinic acid, and the above tin-loaded catalyst carrier was impregnated by the incipient wetness impregnation method. After drying at 110° C. and then calcination in an air atmosphere at 500° C. for 2 hours, a catalyst precursor was obtained. The obtained catalyst precursor was reduced to 400° C. under a hydrogen condition and maintained for 4 hours, which could obtain the desired hydrocracking catalyst C5. Based on parts by weight, it consisted of: 0.05 parts of Pt-0.15 parts of Pd-1.4 parts of Sn/65 parts of β zeolite-5 parts of SRZ-21-28.4 parts of $SiO_2$ as balance.

Feedstock 2 was used as the feedstock oil. The reaction conditions were: temperature of 360° C., pressure of 6.0 MPa, LHSV of 1.2 hour$^{-1}$, hydrogen-oil volume ratio of 2000. After a stable operation for 24 hours, samples were taken for analysis and calculation, wherein the total conversion was 96.35% and the total selectivity of chemical raw materials was 81.73%. The reaction condition and the feedstock remained unchanged, and after 200 hours of online operation, samples were taken for analysis and calculation, wherein the total conversion was 95.09%, and the total selectivity of chemical raw materials was 80.92%. The activity attenuation rate of the catalyst at 200 h was 1.31%.

After further analysis, the content of tetracyclic and more superheavy aromatics in the hydrocracking product of 200 hours of online operation was 0.07%.

Example 7

The hydrogen-type β zeolite raw material is the same as β zeolite in Comparative Example 1;

The layered MWW-type zeolite is selected from the SRZ-21 zeolite prepared in Example 1.

After the above hydrogen-type β zeolite, SRZ-21 zeolite and pseudoboehmite were fully mixed, they were kneaded, extruded, dried at 120° C., and then calcined in an air atmosphere at 530° C. for 2 hours, to obtain a desired catalyst carrier. Stannic chloride was dissolved in water, loaded on the catalyst carrier by the incipient wetness impregnation method, dried at 110° C. and then calcined in an air atmosphere at 400° C. for 2 hours. A bimetallic aqueous solution was formulated with nickel nitrate and ammonium tungstate, and the above tin-loaded catalyst carrier was impregnated by the incipient wetness impregnation method. After drying at 90° C. and then calcination in an air atmosphere at 500° C. for 2 hours, a catalyst precursor was obtained. The obtained catalyst precursor was reduced to 450° C. under a hydrogen condition and maintained for 4 hours, which could obtain the hydrocracking catalyst C6 of the present invention. Based on parts by weight, it consisted of: 3.4 parts of Ni-1.8 parts of Sn-12.3 parts of $WO_x$/51 parts of β zeolite-9.5 parts of SRZ-21-22 parts of $Al_2O_3$ as balance, wherein x was 2.45.

Feedstock 1 was used as the feedstock oil. The reaction conditions were: temperature of 375° C., pressure of 8.5

MPa, LHSV of 1.0 $hour^{-1}$, hydrogen-oil volume ratio of 3000. After a stable operation for 24 hours, samples were taken for analysis and calculation, wherein the total conversion was 94.59% and the total selectivity of chemical raw materials was 92.05%. The reaction condition and the feedstock remained unchanged, and after 200 hours of online operation, samples were taken for analysis and calculation, wherein the total conversion was 92.87%, and the total selectivity of chemical raw materials was 91.23%. The activity attenuation rate of the catalyst at 200 h was 1.82%.

After further analysis, the content of tetracyclic and more superheavy aromatics in the hydrocracking product of 200 hours of online operation was 0.23%.

Comparative Example 2

The hydrogen-type β zeolite raw material is the same as β zeolite in Comparative Example 1;

Hydrogen-type MCM-22 zeolite is taken from SINOPEC CATALYST DIVISION; the hydrogen-type MCM-22 zeolite is a typical MWW-type zeolite, which has a particle thickness of about 1.5 μm and a SAR of 45.

After the above hydrogen-type β zeolite, MCM-22 zeolite and pseudoboehmite were fully mixed, they were kneaded, extruded, dried at 120° C., and then calcined in an air atmosphere at 530° C. for 2 hours, to obtain a desired catalyst carrier. A bimetallic aqueous solution was formulated with nickel nitrate and ammonium tungstate, and the above catalyst carrier was impregnated by the incipient wetness impregnation method. After drying at 90° C. and then calcination in an air atmosphere at 500° C. for 2 hours, a catalyst precursor was obtained. The obtained catalyst precursor was reduced to 450° C. under a hydrogen condition and maintained for 4 hours, which could obtain the hydrocracking catalyst C7 of the present invention. Based on parts by weight, it consisted of: 3.5 parts of Ni-12.5 parts of $WO_x$/52 parts of β zeolite-10 parts of MCM-22 parts of $Al_2O_3$ as balance, wherein x was 2.40.

Feedstock 1 was used as the feedstock oil. The reaction conditions were: temperature of 375° C., pressure of 8.5 MPa, LHSV of 1.0 $hour^{-1}$, hydrogen-oil volume ratio of 3000. After a stable operation for 24 hours, samples were taken for analysis and calculation, wherein the total conversion was 90.15% and the total selectivity of chemical raw materials was 87.08%. The reaction condition and the feedstock remained unchanged, and after 200 hours of online operation, samples were taken for analysis and calculation, wherein the total conversion was and the total selectivity of chemical raw materials was 81.05%. The activity attenuation rate of the catalyst at 200 h was 16.10%.

After further analysis, the content of tetracyclic and more superheavy aromatics in the hydrocracking product of 200 hours of online operation was 0.53%. Data of the content of tetracyclic and more superheavy aromatics in the hydrocracking product of 200 hours of online operation obtained in all the [Comparative Examples] and [Examples 2-7] are summarized in Table 3.

TABLE 3

| Catalyst | Content of superheavy aromatics, % |
|---|---|
| C0 | 0.55 |
| C1 | 0.27 |
| C2 | 0.09 |
| C3 | 0.20 |
| C4 | 0.16 |
| C5 | 0.07 |
| C6 | 0.23 |
| C7 | 0.53 |

The invention claimed is:

1. A hydrocracking catalyst for a feedstock oil rich in polycyclic aromatics, comprising:

a) a β zeolite, b) a layered MWW-type zeolite, c) a metal functional component, d) a binder, and e) a metal function regulating component, wherein the layered MWW-type zeolite has a lamellar thickness of 2-12 nm, wherein the metal functional component is in a non-sulfurized state and is selected from platinum, palladium, a combination of platinum and palladium, a combination of at least one of a Group VIII metal, a Group IIB metal, and a Group VIB metal oxide, and wherein the metal function regulating component is selected from tin, bismuth, and combination thereof.

2. The catalyst according to claim 1, wherein, based on a total zeolite weight of 100 parts, the metal functional component is 0.1 to 60 parts, calculated based on the metal element contained in the metal functional component; and/or the binder is 5 to 2000 parts.

3. The catalyst according to claim 1, wherein the β zeolite accounts for 50-99 wt % of the total zeolite weight.

4. The catalyst according to claim 1, wherein the layered MWW-type zeolite accounts for 1-50 wt % of the total zeolite weight.

5. The catalyst according to claim 1, wherein:

the β zeolite has a silica-to-alumina ratio between 10 and 200; and/or the β zeolite has a pore spaciousness index between 15 and 18; and/or the layered MWW-type zeolite has a lamellar thickness in the range of 2-10 nm; and/or the layered MWW-type zeolite has a silica-to-alumina ratio between 10 and 100; and/or the binder is alumina or silica.

6. The catalyst according to claim 1, wherein the metal functional component is platinum, palladium, or both; or the metal functional component is a composite comprising at least one selected from nickel Ni, cobalt Co, and zinc Zn in a non-sulfurized state, and at least one selected from molybdenum oxide MoOx and tungsten oxide WOx.

7. The catalyst according to claim 1, wherein, calculated based on the metal element contained in the metal function regulating component, a weight ratio of the metal functional component to the metal function regulating component is (0.1 to 20):1.

8. A method for preparing the hydrocracking catalyst according to claim 1, comprising molding a catalyst carrier containing the β zeolite and the layered MWW-type zeolite and loading the components including the metal functional component and the metal function regulation component to obtain a catalyst precursor, and then reducing the catalyst precursor.

9. The preparation method according to claim 8, characterized in it comprises the following steps:

1) mixing and drying components including the p zeolite and the layered MWW-type zeolite and the binder, then calcining in an air atmosphere at 500 to 600° C. to obtain a desired catalyst carrier;
2) formulating the metal compound of the metal function regulating component into a first metal aqueous solution, carrying out an incipient wetness impregnation of the catalyst carrier obtained in step 1), and calcining in air atmosphere at 350 to 500° C. after drying;
3) formulating a second metal aqueous solution with metal components comprising a metal compound of the noble metal(s) of platinum and/or palladium, or comprising at least one of the Group VIII metal compound and the Group IIB metal compound and a Group VIB metal compound; impregnating the catalyst carrier obtained above by an incipient wetness impregnation method, calcining in an air atmosphere at 450 to 580° C. after drying to obtain a catalyst precursor; and
4) reducing the obtained catalyst precursor under hydrogen condition to 400 to 500° C. to obtain the catalyst.

10. A method of hydrocracking a feedstock oil rich in aromatics, comprising contacting the catalyst according to claim 1 with the feedstock oil under a hydrocracking condition.

11. The method according to claim 10, wherein the aromatics in the feedstock oil have a weight percentage of greater than 50% by weight; and/or the feedstock oil has a nitrogen content of ≤20 ppm and a sulfur content of ≤200 ppm.

12. The application according to claim 10, characterized in that, conditions of the hydrocracking reaction include: a temperature of 300 to 450° C., a hydrogen partial pressure of 2.0 to 10.0 MPa, a liquid hourly space velocity of 0.2 to 4.0 hour$^{-1}$, a hydrogen/oil volume ratio of 500 to 4000.

13. The application according to claim 10, characterized in that a single-pass conversion of fractions at above 200° C. is greater than 70% by weight, and a total selectivity for chemical raw materials including light aromatics and $C_2$-$C_5$ light alkanes is greater than 80% by weight.

14. A method for converting polycyclic aromatics, comprising contacting a feedstock oil comprising polycyclic aromatics with the catalyst of claim 1.

15. The catalyst according to claim 1, wherein the feedstock oil comprises greater than 50% by weight of aromatics.

16. The catalyst according to claim 1, wherein the β zeolite is a hydrogen-type β zeolite.

17. The catalyst according to claim 7, wherein a weight ratio of the Group VIB metal to the sum of the Group VIII metal and the Group IIB metal is (0.2 to 20):1, calculated based on the metal element contained therein.

18. The catalyst according to claim 1, wherein:

the Group VIII metal is at least one selected from cobalt and nickel; and/or the Group VIB metal oxide is at least one selected from oxides of molybdenum and oxides of tungsten; and/or the Group IIB metal is zinc.

* * * * *